May 25, 1937. H. T. LAMBERT 2,081,824
CLUTCH MECHANISM
Filed March 25, 1936 4 Sheets-Sheet 2

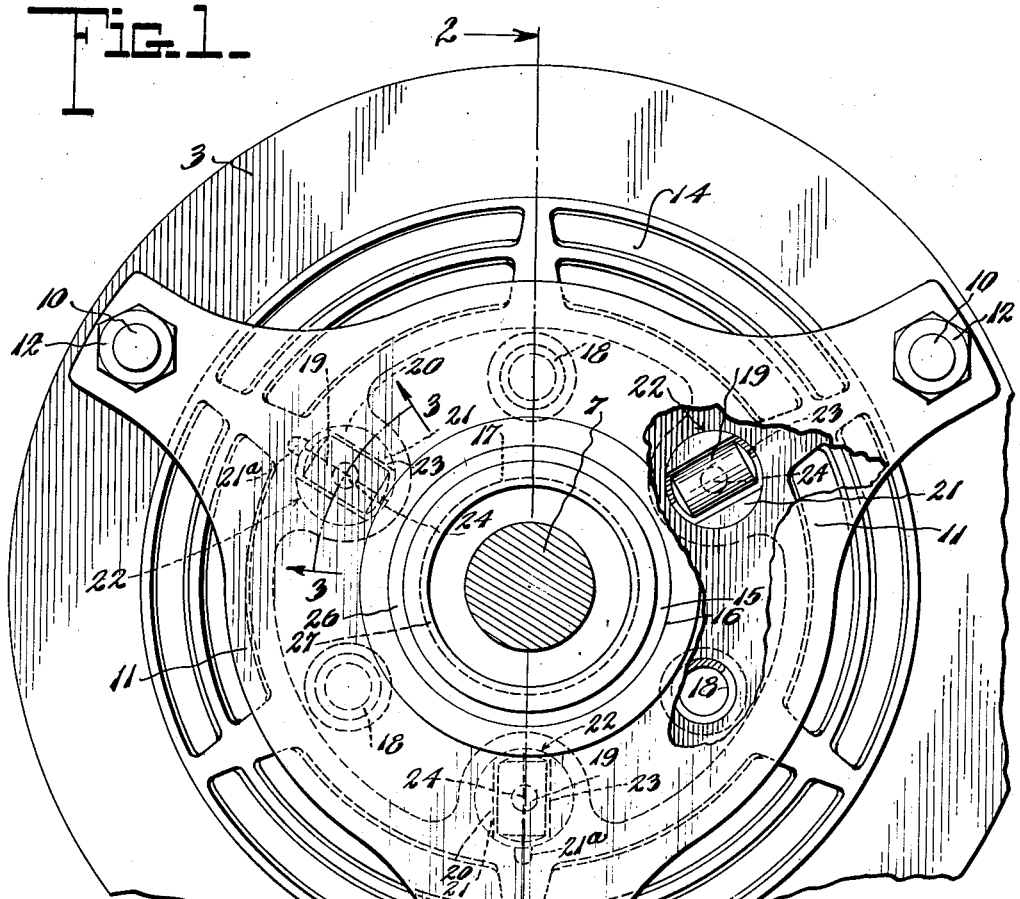
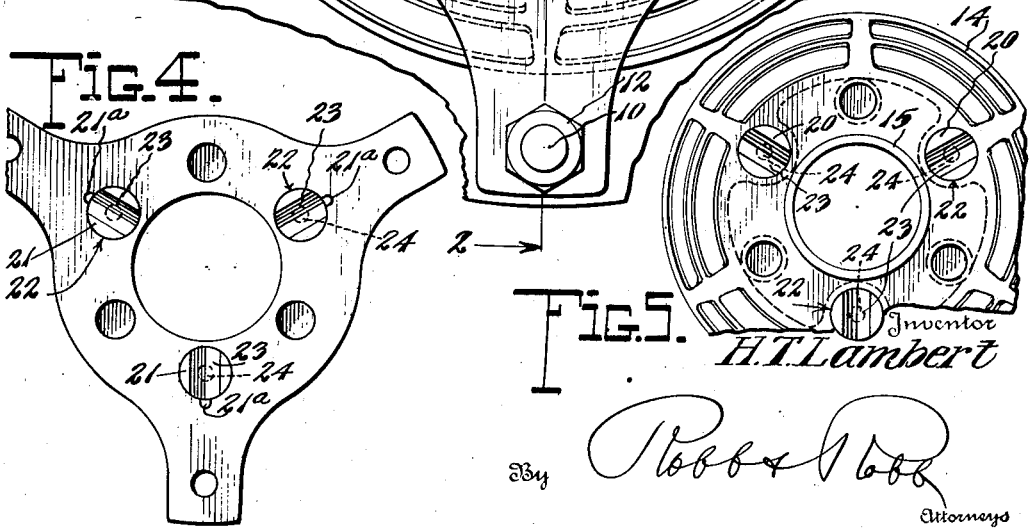

Inventor
H. T. Lambert
By Robb & Robb
Attorneys

May 25, 1937. H. T. LAMBERT 2,081,824
CLUTCH MECHANISM
Filed March 25, 1936 4 Sheets-Sheet 3
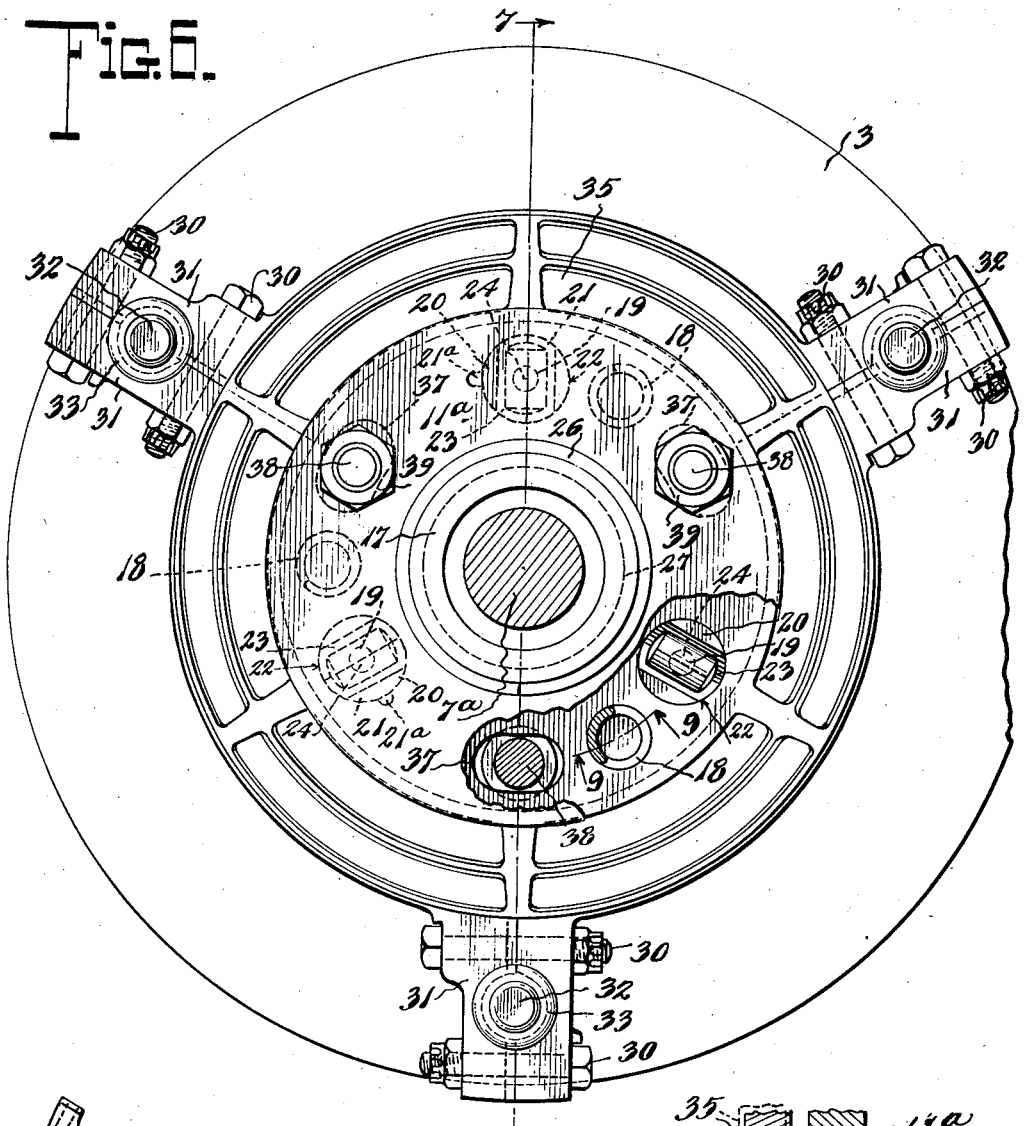
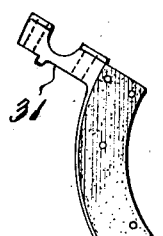
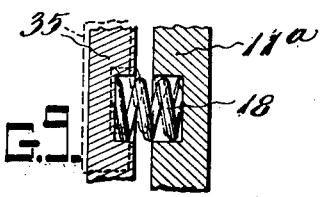
Inventor
H. T. Lambert
By Robb & Robb
Attorneys

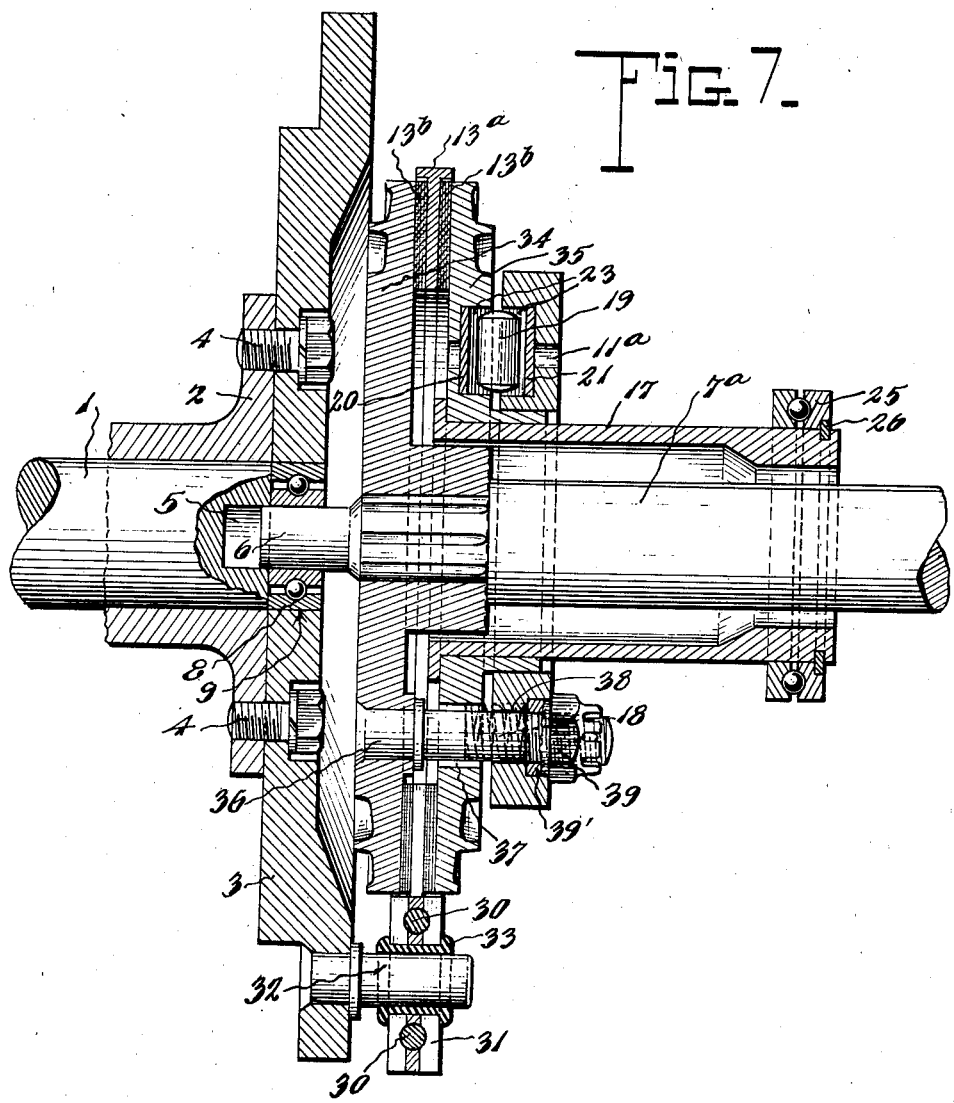

Patented May 25, 1937

2,081,824

UNITED STATES PATENT OFFICE 2,081,824

CLUTCH MECHANISM

Homer T. Lambert, St. Joseph, Mich.

Application March 25, 1936, Serial No. 70,843

8 Claims. (Cl. 192—32)

The present invention relates to improvements in clutch mechanisms, and has for its primary object the provision of a power coupling device capable of being cheaply manufactured and repaired by reason of its simplicity of structure while at the same time affording a powerful, quick-acting clutching means unusually free from the tendencies of slippage and heating commonly characterizing mechanisms of this type.

A further object in view is the provision of a mechanism embodying pressure and clutch elements so constructed and mounted with respect to each other and to power or energizer means as to initially establish a frictional contact between said elements, and as an incident thereto a positive compression action which effectively couples or clutches the parts together.

More specifically, my invention embodies in one form a driving member, a pressure member operatively connected therewith, and an associated driven member, combined with camming or thrust instrumentalities so arranged that, when the pressure member is brought into frictional contact with the driven member by axial movement, a relative rotation between the parts takes place causing the thrust instrumentalities to produce compression or clutching together of the coupling parts.

A still further object of my invention is to provide a clutch mechanism especially suitable for automobiles, and by means of which the travel of the actuating pedal, as well as the releasing pressure, is very greatly reduced compared with those factors of the conventional type of mechanism now in use, while the clutching or holding pressure is greatly increased and increases in proportion to the load imposed upon the clutching parts.

By slight modification, my invention partakes of two distinct forms, namely, a single plate type and a double plate type, in the latter of which the clutch ring or member is operatively connected to the driving member and disposed between two pressure plates operatively connected with the driven member, one of said plates being relatively movable axially and rotatively with respect to the other so as to produce a compressive action when brought into frictional contact with the clutch ring under the control of associated self-acting thrust instrumentalities.

Another feature of primary importance in this two plate type of my invention resides in the facility of replacement of the clutch ring and adjustment of the parts to take up wear, without the necessity of either disassembling or removing the clutch mechanism for this purpose.

Still another object in view is the provision of a clutch unit in which the parts are so associated that the clutching action for coupling increases in direct relation to the pull or load imposed upon the driven member while the release of the clutching action, as regards the pressure for effecting the same, is greatly facilitated and reduced to a minimum as the load imposed upon the driven member is reduced under the control of the prime mover.

Other and further objects and advantages of the invention will be hereinafter set forth and the novel features thereof defined by the appended claims.

In the accompanying drawings,—

Figure 1 is a front elevation of a clutch assembly unit, parts being broken away and shown in section to more clearly disclose certain details.

Figure 4 is a rear view of the power or energizer plate.

Figure 5 is a rear view of the shiftable pressure plate.

Figure 6 is a view in elevation of a modified form of clutch assembly unit, parts being broken away and shown in section to disclose more clearly certain details of construction.

Figure 7 is a transverse, sectional view on the line 7—7 of Figure 6.

Figure 8 is a detailed view of one of the component sections of the clutch ring, and Figure 9 is a fragmentary, sectional view on the line 9—9 of Figure 6, showing more clearly one of the expansion springs for separating the pressure plate from the energizer plate.

Like reference characters designate corresponding parts in the several figures of the drawings.

Figure 2:
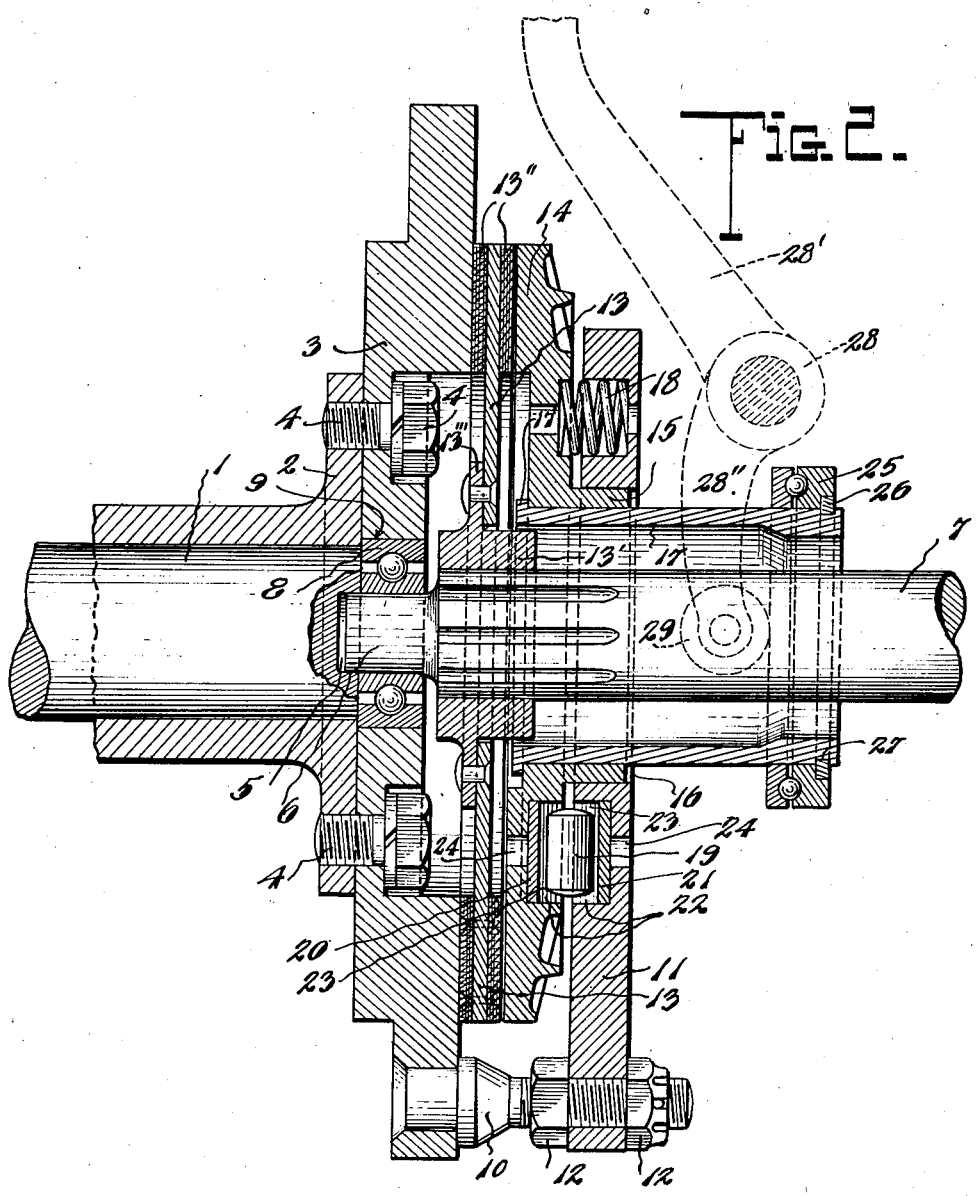
Figure 2 is a longitudinal, sectional view taken about on the plane of line 2—2 of Figure 1.

Referring to the drawings, and in particular to that form of my invention shown in Figures 1 to 5, I designates a driving member or crank shaft of a prime mover, and 2 the crank shaft flange to which the fly-wheel 3 is secured, as by means of the stud bolts 4. The end of the crank shaft is formed with a recess 5 to receive the pilot or reduced extremity 6 of the pinion or transmission shaft 7, herein referred to as the driven member, said pilot being surrounded by a ring bearing 8 seated within a center aperture 9 of the fly-wheel. The construction thus far described is more or less conventional.

Mounted in openings in the peripheral portion of the fly-wheel 3 is a series of mounting studs 10 equally spaced from each other and arranged to supportingly receive what I call, for the purposes of this description, a power or energizer plate 11. The studs 10 are threaded at their free ends so as to receive adjusting nuts 12 which co-act with the radial arms of plate 11 at opposite sides thereof, as clearly seen in Figure 2 of the drawings. Thus the plate or spider 11 rotates with the fly-wheel during the operation of the prime mover, and said plate is sufficiently spaced from the fly-wheel to receive therebetween the clutching elements now to be set forth.

Upon the end of the pinion shaft 7 is mounted the clutch plate 13, which is preferably composed of the hub portion 13' splined on the shaft, to the annular flange 13''' of which is riveted or otherwise fastened the clutch plate proper, and the opposite faces of this plate at its peripheral portion have secured thereto the usual friction or lining material 13'', this clutch element being so arranged as to lie close to the inner face of the fly-wheel. Between this clutch plate and the energizer plate 11 is disposed what I term a pressure or actuating plate 14. This latter plate is formed about its central opening with a lateral annular flange or collar 15, which is journaled in the central opening 16 of the energizer plate. The pressure plate 14 also carries an operating or release sleeve 17 which extends through the center of the plate with a tight press fit, the inner end of this sleeve having a flange or shoulder 17' engaging the inner recessed face of the pressure plate. This mounting of the sleeve, concentric with the shaft 7, affords a floating arrangement which permits the plate to move both axially and rotatively within the opening of the energizer plate 11 in a manner hereinafter set forth, and giving rise to a quick and powerful frictional contact with the clutch member 13 for reasons hereinafter explained.

Interposed between the pressure and the energizer plates is a series of actuating springs 18 which are seated in suitable recesses in the respective plates, the recess for one end of the spring in each instance being preferably relatively deep so as to afford a supporting wall for the coils of the springs for a major portion of the length of the same. These springs not only exert a pressure upon the pressure plate 14 tending to normally move said plate against the clutch plate 13, but they also act to resist relative rotative movement of the plate 14 with respect to the energizer plate during the clutch operation. When relative rotation does occur, these springs quickly restore the plate 14 to its normally operative position and thereby effect release of the clutch as will now more clearly become apparent.

Figure 3:
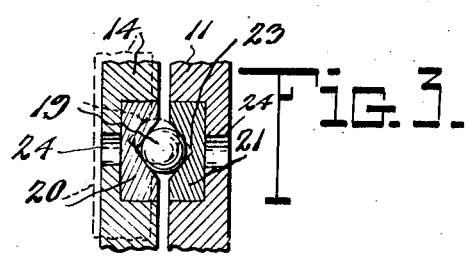
Figure 3 is a detailed, sectional view on the line 3—3 of Figure 1, showing the power or thrust elements and associated parts.

The powerful clutching force or compression of the clutch member between the fly-wheel and the pressure plate to effect a coupling of the driving with the driven member is produced by means of a set of equally or uniformly spaced rollers 19, each of which co-acts with a pair of camming inserts or discs 20—21, as best seen in Figures 2 and 3 of the drawings. Each of the parts 14 and 11 is provided with a series of recesses 22, circular in cross section and of a depth to snugly receive and accommodate their respective discs. Each disc is preferably of hardened material, such as hardened tool steel, or case-hardened steel, and each is provided with a substantially V-shape groove 23 facing a corresponding groove of the other disc, said discs being spaced sufficiently to receive their roller within the grooves. The rollers thus rest against the inclined faces of the grooves and are adapted to ride along said faces when the pressure plate 14 is moved angularly. In other words, with such angular shifting of the pressure plate 14, the rollers act as wedges to relatively separate or push apart the members 14 and 11 with respect to each other, and, since the member 11 is held against outward movement, it is obvious that the pressure plate 14 is thereby thrust axially inward under the wedging or spreading power of the rollers 19, such action bringing the pressure plate into frictional contact with the clutch plate 13 and compressing it against the face of the fly-wheel 3.

An important feature of the mounting of the camming inserts or discs 20—21 is the provision for rotation of at least one of such inserts of a pair in its socket or recess while the other is preferably held stationary. Thus, the disc 20 is free to rotate, while the disc 21, as shown in Figure 4, is fixed by the provision of a pin 21a extending radially from the disc into a notch or slot formed in the plate 11 to receive the same. Each of these discs may be readily manually inserted into its socket during assembly of the parts. They may be easily knocked out of their seats by inserting an implement through the openings 24 in the respective plates 14 and 11. It should be noted that by virtue of the mounting of one of the insert discs for free angular movement, any suitable length of roller member may be employed, because this arrangement avoids friction which would occur where the inserts are both fixed by parts of the roller moving at a different speed than other parts, and hence wear of the inserts is thus reduced to a minimum. By permitting movement of one of the inserts, the bearing surface against which the roller acts may adjust itself to maintain the required alinement with the opposing bearing surface.

At the outer end of the sleeve 17 there is mounted a thrust bearing or collar 25 which is locked to the sleeve by a snap ring 26 seated in an annular groove 27. Through this collar the sleeve 17 may be shifted axially by the clutch operating member 28, which may be of any conventional form, but, as diagrammatically shown in dotted lines in Figure 2, comprises the arm 28' adapted to be connected to the clutch pedal or other manually operating means (not shown), and the yoke 28'' having roller elements 29 to bear against the inner face of the bearing 25.

Normally in disengaged position, the plate 14 is held retracted by means of the member 28 in the customary manner, the springs 18 being compressed sufficiently to hold the face of the pressure plate slightly away from the face of the adjacent lining 13'' of the clutch plate 13. This in turn permits the plate 13 and its transmission shaft 7 to remain stationary, as when the prime mover is idling. When, however, the member 28 is shifted for clutch action, the pressure plate 14 is moved axially by the springs 18 to bring it into frictional contact with the clutch plate 13, the contact being sufficient to initially cause a relative angular or rotative movement of the plate 14 by the retarding action caused by the inertia of the driven member, which causes the roller members 19 to ride up the camming faces of the discs 20—21, thereby positively and under power forcing the plate 14 into firm engagement with the clutch plate and compressing the latter against the fly-wheel so as to couple the driving and driven members together, for corresponding movement. The extent of this engagement, it is important to note, is proportionate to the power exerted. This single plate type clutch may be very cheaply manufactured and is very powerful to the extent of delivering a maximum load in every instance whenever applied.

The release of the clutch will readily be understood to take place when the foot pedal is operated with the proper ratio of leverage connection to the yoke 28", and through the throw-out collar 25 and sleeve 17, the retraction of which simply reseats the rollers 19 in the inserts when the springs 18 are compressed. This action releases frictional contact of the pressure plate with the clutch plate.

It is obvious from the foregoing description that in this type of clutch the pedal travel will be much less than that of the present commonly used type of clutch. Therefore, the foot pedal can be reduced from the conventional height of six and one-half inches to eight inches above the floor board to about two inches, and this will permit a much more convenient declutching operation by the tip of the toe only. Because of the operation of the clutching members very close to the contacting point, the travel is very short, yet a sufficient clearance is afforded to prevent heating when the engine is idling. Furthermore, as the power of the prime mover approaches zero, the pressure plate is automatically shifted angularly in the reverse direction to its initial movement, under the torsional action of the springs 18, which immediately frees the power rollers 19, and the pressure required of the foot to effect release, by shifting of the operating sleeve 17, is accordingly very slight.

In this connection it is proper to state that the releasing pressure now being maintained in the present known types of automotive clutches is from sixteen hundred to eighteen hundred pounds, which is required to prevent slipping and heating of the contacting elements. However, by my present invention herein disclosed, the spring pressure may be reduced to approximately, or not more than, five hundred pounds; but by virtue of the use of the roller thrusts, the pressure exerted in clutching may run as high as four thousand pounds during a severe or heavy load, according to tests which I have made.

Another advantage of my type of clutch mechanism herein set forth resides in the fact that the mechanism does not necessitate any housing, and is, in fact, entirely open to the air for cooling purposes in case there should be any slippage from wear or other causes.

Passing now to the modified form of my invention, shown in Figures 6 to 9, it will be noted that this type is quite similar to the single plate type hereinbefore described, excepting that the pressure of the clutching action is entirely self-contained between two pressure plates. In this form, the clutch plate or ring 13a, with its linings 13b, is formed of separate sections or segments, preferably three in number, one of which is specifically shown in Figure 8, said segments being connected together by bolts 30 passing through apertured and notched extensions 31. This ring is supported upon three stud members 32 fixed in the engine fly-wheel 3. The mounting of the ring on the equally spaced studs 32 includes rubber grommets 33 which permit ready adjustment of the ring at the proper position, and self-adjustment as may be required from wear.

The clutch ring in this form is disposed between two pressure plates, as before stated, one, the inner supporting plate 34, splined to the pinion shaft 7a, being fixed to said shaft by a close sliding fit, and the other, the free floating pressure plate 35, being carried by the energizer plate in the precise manner of the corresponding plate disclosed in reference to the first described form. The fixed plate 34 is provided with a series of stud bolts 36, corresponding to the bolts 10 in the first form, the free ends of said bolts extending through elongated openings 37 in the floating plate 34, the ends of which openings delimit the extent of angular movement of said plate 34. The studs 36 also extend through suitable apertures 38 in the energizer plate 11a and are threaded to receive the nuts 39 which have sleeve extensions 39' to seat in counterbores in the apertures 38. This fixed plate 34 and the energizer plate 11a are bound together as a unit under the circumstances, and move with the transmission shaft 7a. The floating pressure plate 35 is otherwise constructed and operated exactly like the pressure plate 14 of the first form, the operating sleeve, camming or power rollers, co-operating inserts, and compression springs corresponding with those parts in said form, and, therefore, bearing the same reference characters. In this instance, however, the clutch ring 13a, operating with the engine fly-wheel, upon clutch action, picks up the floating pressure plate 35, causing a partial rotation or angular movement thereof which immediately causes the rollers 19 to ride up the camming faces of the co-operating inserts, thereby effecting axial movement of the plate 35 to compress the clutch ring against the fixed plate 34. It will be apparent that the principle of the two constructions hereinbefore described is the same, but the particular advantage of the second form resides in the provision of the sectional clutch ring. To demount this ring for repair or other purposes, it is only necessary to release the spring pressure between the power plate 11a and the pressure plate 35 by depressing the clutch pedal, remove four of the six clamping bolts 30, as shown, permitting one of the segments of the ring to be removed, and then displace the two remaining sections of the clutch ring which may be separated by removing the two remaining bolts. Such an operation is extremely simple as compared with the process of repairing the present known type of single drive plate clutches which requires anywhere from several hours to a whole day to remove, re-line, and replace the clutch. Many rods, bolts, nuts, etc. have to be removed in the older type of construction, and, in some instances, it is necessary to remove the entire engine to repair the clutch ring or even adjust it. Obviously, my invention affords a very great saving in time and expense, in these operations. It might be added that even where my clutch mechanism is enclosed in a clutch housing, by the provision of a cover plate which may readily be displaced, ample space to demount the clutch ring may be easily afforded.

It will be obvious that changes may be made in the details of construction of the invention as herein illustrated without departing from the spirit of the invention as set forth in the accompanying claims.

What I claim is:—

1. In clutch mechanism of the class described, the combination, with a driving member and a driven member, of a clutch element operatively connected to one of said members, an energizer element connected to the other of said members, a pressure plate mounted at one side of the clutch element, yieldable means intermediate the energizer element and the pressure plate for shifting the latter into contacting relation to the clutch element to effect relative angular displacement of the pressure plate, and separate camming means automatically rendered operative by said angular displacement of the pressure plate to force the latter into clutching engagement with the clutch element to couple the driving and driven members together, said yieldable means upon declutching reversing the angular displacement of the pressure plate and normalizing the camming means.

2. In clutch mechanism of the class described, the combination, with a driving member including a flywheel and a driven member, of a clutch member carried by the driven member, an energizer plate, circumferentially spaced supporting studs adjustably connecting said plate to the flywheel in spaced relation thereto, a pressure plate mounted on the energizer plate for free axial and angular movements, spring means intermediate the pressure and energizer plates and arranged when released to shift the pressure plate axially into frictional engagement with the clutch member to thereby cause partial rotation of the pressure plate by the contact, means for adjusting the energizer plate to control the tension of said spring means, free roller members between the energizer and pressure plates, mounted between camming surfaces for shifting the pressure plate into clutching engagement with the clutch member and compress the latter against the fly-wheel upon the rotation of the pressure plate aforesaid, and means for declutching the pressure plate comprising a separate releasing sleeve having its bearing in the pressure plate.

3. In clutch mechanism of the class described, the combination, with a driving member and a driven member, of a friction plate connected to one of said members, a segmental clutch member movably connected to one of said first-mentioned members, each segment of said clutch member having a peripheral attaching extension, separate means for attaching the contiguous extensions directly to each other to form a unitary clutch disc, and means for compressing the clutch member against the friction plate, said clutch member being displaceable by removal of the separate connecting means aforesaid and radial separation of the segments thereof without displacement of the co-acting parts.

4. In clutch mechanism of the class described, the combination, with a driving member and a driven member, of a relatively stationary plate secured to one of said members, an energizer plate arranged in spaced relation to the stationary plate, a pressure plate mounted between the energizer plate and the stationary plate for axial and angular movements, means connecting the stationary and energizer plates and disposed to be impinged by the pressure plate to limit the angular movements thereof, a clutch ring connected to one of said first-mentioned members, spring means intermediate the pressure and energizer plates normally urging the former into frictional contact with the clutch ring, and co-acting power devices intermediate the pressure and energizer plates automatically operative upon frictional contact of the pressure plate with the clutch ring to compress the clutch ring between the stationary and pressure plates.

5. Clutch mechanism as set forth in claim 4 wherein the clutch ring is composed of a plurality of separable complemental segments connected to each other by displaceable fasteners arranged exteriorly of the stationary and pressure plates and holding the ring upon one of the members to be coupled.

6. Clutch mechanism as set forth in claim 4 wherein the connecting means for the stationary and energizer plates consists of stud bolts carried by the stationary member and which bolts extend through elongated openings in the pressure plate so as to limit oscillatory movements of the last-named plate.

7. Clutch mechanism as set forth in claim 4 combined with a clutch release sleeve having interlocking engagement with the pressure plate for retracting said plate in declutching.

8. In clutch mechanism of the class described, the combination, with a driving member and a driven member, of a friction plate connected to one of said members, a segmental clutch member movably connected to one of said first-mentioned members, separate means for connecting the segments of the clutch member together to form a clutch disk, and means for compressing the clutch member against the friction plate, said clutch member being displaceable by separation of the segments without displacement of the coacting parts, said driving member including a fly-wheel having supporting studs upon which the clutch member is shiftably mounted, the segments of said clutch member being separable from each other at said studs.

HOMER T. LAMBERT.